United States Patent [19]

Whitney et al.

[11] Patent Number: 5,161,051
[45] Date of Patent: Nov. 3, 1992

[54] SIMULTANEOUS DUAL FIELD OF VIEW SENSOR

[75] Inventors: Colin G. Whitney, Agoura Hills; Bruce A. Cameron, Simi Valley, both of Calif.

[73] Assignee: Hughes Aircraft Company, Los Angeles, Calif.

[21] Appl. No.: 627,164

[22] Filed: Dec. 13, 1990

[51] Int. Cl.⁵ ............... G02B 13/14; G02B 17/08
[52] U.S. Cl. ............... 359/351; 359/353; 359/357; 359/420; 359/634; 359/722; 359/731; 359/859; 244/3.16
[58] Field of Search ............ 350/1.1, 1.2, 1.3, 1.4, 350/438, 439, 442, 537, 557, 558, 561, 620, 174, 505; 244/3.16, 3.17; 359/350, 722, 723, 399, 419, 420, 423, 859, 366, 355, 356, 357, 351, 353, 726, 727, 730, 731, 629, 634

[56] References Cited

U.S. PATENT DOCUMENTS

| | | | |
|---|---|---|---|
| 4,354,742 | 10/1982 | Abel et al. | 350/442 |
| 4,453,800 | 6/1984 | Fjeldsted | 350/1.4 |
| 4,877,317 | 10/1989 | Gibbons et al. | 350/559 |
| 4,950,056 | 8/1990 | Smith | 350/1.2 |
| 5,022,723 | 6/1991 | Schmidt et al. | 350/1.2 |

FOREIGN PATENT DOCUMENTS 108997 2/1942 Sweden .................. 350/558

Primary Examiner—Paul M. Dzierzynski
Assistant Examiner—David R. Parsons
Attorney, Agent, or Firm—R. M. Heald; C. D. Brown; W. K. Denson-Low

[57] ABSTRACT

An optical system (10) for producing dual fields of view simultaneously. The system (10) includes a first optical system (12) for producing a first field of view image and a second optical system (36) for producing a second field of view image where the angular displacement of the second field of view is different from that of the first field of view. A dichroic beamsplitter (22) is disposed in the present invention so as to reflect light from the first optical system (12). The dichroic beamsplitter (22) is also disposed so as to simultaneously transmit light from the second optical system (36). As a result, the reflected light (20) is primarily composed of light of a first wavelength band and the transmitted light is primarily composed of a second wavelength band. The light from the two different fields of view are then directed to a dual filter (32) which passes the first wavelength band in one portion and passes the second wavelength band in another portion. Light passing through the dual filter (32) may then be focused onto a sensor (34) which will then detect the first field of view image on one area and simultaneously detect the second field of view image on another area.

14 Claims, 1 Drawing Sheet

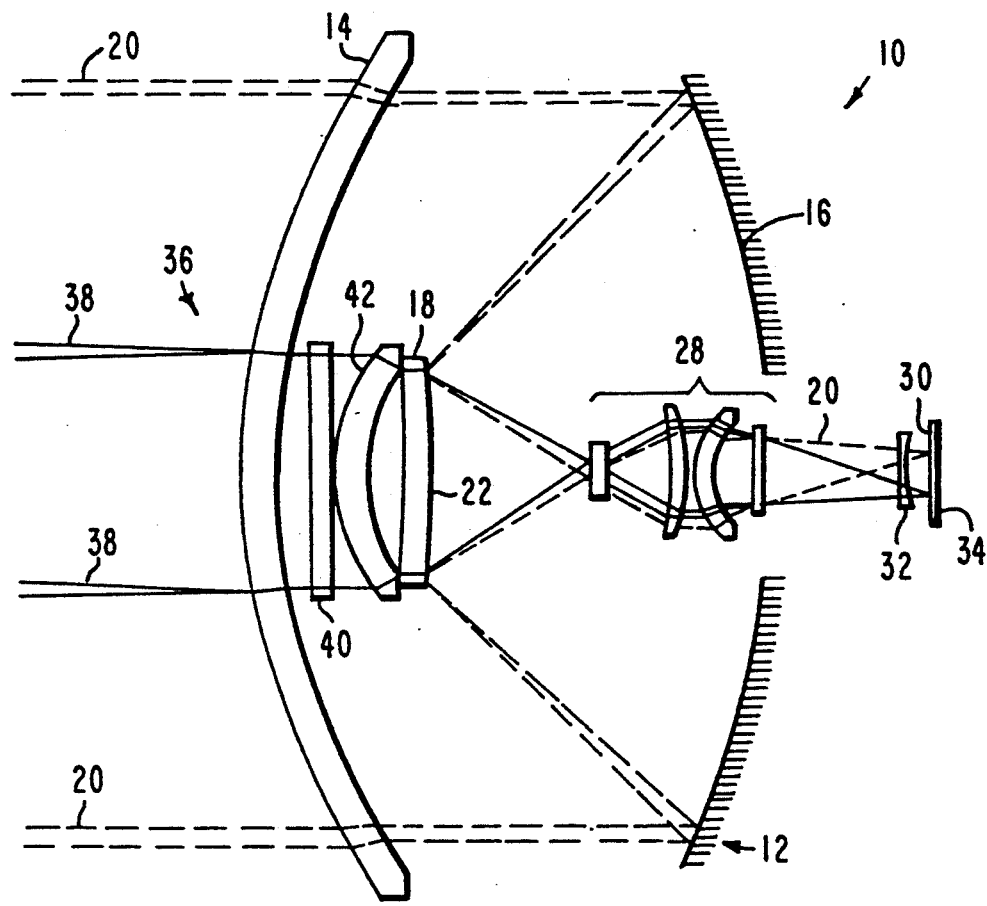
Fig. 1.
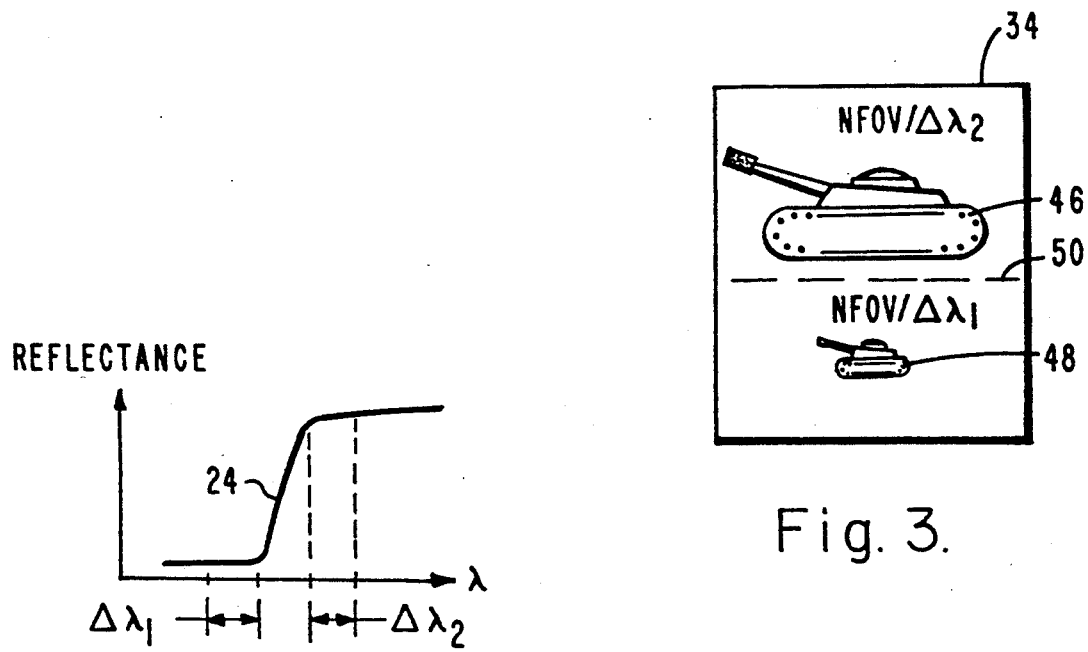
Fig. 2.
Fig. 3.

SIMULTANEOUS DUAL FIELD OF VIEW SENSOR

BACKGROUND OF THE INVENTION

1. Technical Field

This invention relates to optical systems, and more particularly to an optical system for producing dual fields of view simultaneously.

2. Discussion

In many applications, it is desirable to have an optical system which can provide multiple views of a scene. Consequently, optical systems such as telescopes have been developed which can provide close up views at high magnification and also, (by changing eye pieces for example), can provide a wider field of view at lower magnification.

Many different configurations exist for altering the magnification and field of view of telescopes, and other optical systems. Such apparatus range from systems where an eye piece is simply changed manually to zoom type optical systems where magnification and field of view are changed in a continuous matter by shifting the position of optical elements. In some cases, however, it would be desirable to have a system for the simultaneous presentation of two different magnifications and fields of view. This is because while one is viewing a close up field of view, one may miss events in the periphery. Conversely, while viewing a wider field of view at lower magnification, one may miss events or details requiring higher magnification. In addition, the mechanism required to shift an optical system from one field of view to another adds bulk and cost to the system.

One solution would be to duplicate the entire optical system thus providing both wide and narrow fields of view simultaneously. Obviously, this greatly increases the cost of the system. In addition, in systems where the optical image is presented to a sensor, such duplications would necessitate duplication of the sensor and further increases in cost and space.

Thus it would be desirable to have an optical system which can provide both wide and narrow fields of view of a scene. Further, it would be desirable to have a system with these features which can provide two fields of view simultaneously. Also, it would be desirable to have such an optical system which can provide the simultaneous dual fields of view at low cost, also which avoids duplication of optical components, and which can be packaged in a relatively compact space. Further, it would be desirable to have an optical system which can provide simultaneous duel fields of view without mechanical action required.

SUMMARY OF THE INVENTION

Pursuant to the present invention, an optical system is provided which can produce dual fields of view simultaneously. The system does this without duplication of optical elements and without mechanical action required. The invention includes a first optical system for producing a first field of view image and a second optical system for producing a second field of view image, where the angular displacement of the second field of view is different from that of the first field of view. A dichroic beamsplitter is disposed in the present invention so as to reflect light from the first optical system. The dichroic beamsplitter is also disposed so as to simultaneously transmit light from the second optical system. As a result, the reflected light is primarily composed of light of a first wavelength band and the transmitted light is primarily composed of light of a second wavelength band. In addition, there is provided an optical component for directing the reflected light onto a first location and a second optical component for directing the transmitted light onto a second location. By arranging the system so that the first and second locations are in close proximity to each other, a single viewer or optical detector can detect both fields of view simultaneously.

BRIEF DESCRIPTION OF THE DRAWINGS

The various advantages of the present invention will become apparent to one skilled in the art by reading the following specification and by reference to the following drawings and in which:

FIG. 1 is a diagram of the optical system in accordance with the present invention;

FIG. 2 is a graph of the reflectance of the dichroic beamsplitter in accordance with the present invention indicating the two bands of wavelength; and FIG. 3 is an example of a view of simultaneous fields of view as received by a sensor in accordance with the present invention.

DESCRIPTION OF THE PREFERRED EMBODIMENT

Referring now to FIG. 1, a diagram of an optical system 10 in accordance with the present invention is shown. The optical system 10 includes a narrow field of view optical system 12 which comprises generally a Cassegrain-type telescope. The narrow field of view optical system 12 consists of a dome lens 14, a primary mirror 16 and a secondary mirror 18. Light from a scene to be viewed with a narrow field of view (at high magnification) is represented by dashed lines 20. This light initially passes through the dome lens 14 and is reflected by the primary mirror 16 toward the secondary mirror 18.

Secondary mirror 18 is coated on the surface receiving the narrow field of view light 20, with a dichroic filter 22. It will be appreciated that a dichroic filter has the characteristic of having a reflectance that is higher for some wavelengths than others.

Referring now to FIG. 2 a reflectance curve 24 for a typical dichroic filter 22 in accordance with the present invention is shown. The curve in FIG. 2 depicts the reflectance of a typical dichroic filter plotted on the vertical axis as a function of wavelength plotted on the horizontal axis. As curve 24 indicates, short wavelengths in the range defined by $\Delta\lambda_1$ are primarily transmitted. It will be appreciated that relatively little of this wavelength is reflected by the filter 22. Very little light of the wavelength defined by $\Delta\lambda_2$ is transmitted and most of the light of this wavelength is reflected by filter 22. As a result, light 20 transmitted by the narrow field of view optical system 12, once is it reflected off dichroic filter 22 on secondary mirror 18, is composed of $\Delta\lambda_2$ wavelengths to a much greater degree than $\Delta_1$ wavelengths.

In a preferred embodiment of the present invention using the long wavelength infrared region, the $\Delta\lambda_1$ region may be 7.75 to 8.5 microns and the $\Delta\lambda_2$ region may be 8.75 to 9.5 microns. Alternatively, using the middle wavelength infrared region, the $\Delta\lambda_1$ region may be 3.5 to 4.2 microns and the $\Delta\lambda_2$ region may be 4.5 to 5.0 microns.

Upon reflecting off the dichroic filter 22, light 20 in the narrow field of view optical system 12 forms an internal image and then passes through a relay lens system 28 which focuses the narrow field of view light 20 onto an image plane 30. Before reaching this image plane 30, the narrow field of view light 20 passes through the upper portion of a dual filter 32. Dual filter 32 is coated with two spectral pass bands. In the upper portion, the dual filter 32 is coated with a filter which passes light in the $\Delta\lambda_2$ spectral region to the exclusion of light in the $\Delta\lambda_2$, region.

An optical detector 34, placed in the image plane 30 must be capable of detecting light in both $\Delta\lambda_1$ and $\Delta\lambda_2$ the spectral regions. While many different types of detectors 34 may be used depending on the particular application, one preferred embodiment utilizes a focal plane array type detector. Examples of focal plane array type detectors are (1) visible ccd arrays such as used commercially for video cameras; (2) PvSi arrays; (3) PvIn Sb Arrays; and (4) PvMgCdTe arrays. It should be noted that dual filter 32 should be placed as close to the detector 34 as possible to minimize the number of rows susceptible to optical cross talk from the adjacent portion of filter 32 as described below.

The optical system 10 in accordance with the present invention also includes a wide field of view optical system 36 which receives light from a wider field of view at lower magnification than the narrow field of view optical system 12. Light entering the wide field of view optical system 36 is depicted by solid lines 38. Wide field cf view light 38 first passes through the dome lens 14 and then through a wedged plate 40 which deviates the wide field of view line of sight so that the center of the wide field of view image at the image plate 30 is laterally displaced relative to that of the narrow field of view. The wedged plate 40 may be wedged in an amount less than one degree in accordance with a preferred embodiment of the present invention. The wide field of view light 38 next passes through lenses 18 and 42 which combined have the purpose of focusing wide field of view light to be coincident with the internal image of the narrow field of new internal image. Wide field of view light 38 passes through the secondary mirror 18 coated with the dichroic filter 22. It will be appreciated that the secondary mirror 18 in this capacity acts a beamsplitter by transmitting wide field of view light and reflecting narrow field of view light onto roughly the same optical axis.

However, in accordance with FIG. 2 it will be appreciated that when wide field of view light 38 passes through the dichroic filter 22, a considerable portion of the $\Delta\lambda_2$ spectral region will be reflected while a correspondingly large portion of the $\Delta\lambda_1$ region will be transmitted. Thus, the transmitted portion of wide field of view light 38 will be composed of a substantially larger portion of $\Delta\lambda_1$ wavelength light as opposed to $\Delta\lambda_2$ wavelength light.

Wide field of view light also passes through the relay lenses 28 as did the narrow field of view light 20. However, having been deviated by the wedge 40, the wide field of view light 38 passes through the lower portion of the dual filter 32. This lower portion of dual filter 32 is coated with a filter which passes light in the $\Delta\lambda_1$ spectral region to the exclusion of light in the $\Delta\lambda_1$ region. As a result, when wide field of view light 38 is brought to a focus at the image plane 30, it is comprised primarily of light of the spectral band $\Delta\lambda_1$. The wide field of view light 38, therefore impinges upon detector 34 in the lower portion of detector 34.

Referring now to FIG. 3, there is shown a view of an image of a tank 46 as imaged by the optical system 10 through the narrow field of view optical system 12 and received by the upper portion of the detector 34. A wide field of view image of the tank 48 is also shown in FIG. 3 as imaged on the lower portion of detector 34 by the wide field of view optical system 36. The point of interface 50 between the upper and lower portions of the detector 34 defines the leading point of light originating from the narrow field of view optical system 12 and the wide field of view optical system 36. It will be appreciated that by placing the dual filter 32 in close proximity to the detector 34, the number of rows of detectors in detector 34 susceptible to optical cross talk from the adjacent field of view will be minimized.

From the above, it can be seen that the present invention provides an optical system which provides two fields of view simultaneously, which has wide applications ranging from commercial optical systems to military applications such as missile systems. The system avoids duplication of optical components and can be packaged in a relatively compact space with a single sensor. Further, the system avoids the necessity of mechanical switching between the two fields of view. While a preferred embodiment has been shown utilizing the present invention on a Casegrain type telescope, it will be appreciated that other kinds of telescope systems such as Newtonian may also be employed with the present invention. Further, those skilled in the art can appreciate that other advantages can be obtained from the use of this invention and that modification can be made without departing from the true spirit of the invention after studying the specification, drawings, and following claims.

What is claimed is:

1. An optical system for producing two different field of view images simultaneously comprising:
    first optical subsystem for producing a first field of view image;
    a second optical subsystem for producing a second field of view image, wherein the angular displacement of said second field of view is different from that of said first field of view;
    an optical detector having first and second areas;
    dichroic beamsplitter means disposed so as to transmit light from said first optical subsystem, and also disposed so as to simultaneously reflect light from said second optical subsystem, wherein said transmitted light is primarily composed of light of a first wavelength band and said reflected light is primarily composed of light of a second wavelength band;
    means for directing said transmitted light onto said first detector area;
    means for directing said reflected light onto said first detector area; and
    a dual filter disposed in front of said detector having a first filter area adjacent to said first detector area for filtering out substantially all light except for said first wavelength band, and also having a second filter area adjacent to said second detector area for filtering out substantially all light except for said second wavelength band.

2. The system of claim 1 wherein said first field of view is wider than said second field of view.

3. The system of claim 2 wherein said second optical subsystem includes a telescope having a primary mirror and wherein said dichroic beamsplitter comprises a secondary mirror for said telescope.

4. The system of claim 3 wherein said telescope is a Cassegrain-type telescope.

5. The system of claim 1 wherein said first field of view and said second field of view have approximately the same optic axis.

6. The system of claim 1 wherein said first wavelength band comprises shorter wavelengths than said second wavelength band.

7. The system of claim 1 wherein said means for directing said reflected light comprises a relay lens system.

8. The system of claim 1 wherein said optical detector has a spectral response that includes both said first and second wavelength bands.

9. An optical system for producing two different field of view images simultaneously comprising:
   first optical subsystem for producing a first field of view image;
   a second optical subsystem for producing a second field of view image, wherein the angular displacement of said second field of view is different from that of said first field of view;
   an optical detector having first and second areas, wherein said detector comprises a focal plane array;
   dichroic beamsplitter means disposed so as to transmit light from said first optical subsystem, and also disposed so as to simultaneously reflect light from said second optical subsystem, wherein said transmitted light is primarily composed of light of a second wavelength band;
   means for directing said transmitted light onto said first detector area; and
   means for directing said reflected light onto said second detector area.

10. An optical system for producing two different field of view images simultaneously comprising:
    first optical subsystem for producing a first field of view image;
    a second optical subsystem for producing a second field of view image, wherein the angular displacement of said second field of view is different from that of said first field of view;
    an optical detector having first and second areas;
    dichroic beamsplitter means disposed so as to transmit light from said first optical subsystem, and also disposed so as to simultaneously reflect light from said second optical subsystem, wherein said transmitted light is primarily composed of light of a first wavelength band and said reflected light is primarily composed of light of a second wavelength band;
    means for directing said transmitted light onto said first detector area, wherein said means for directing said transmitted light comprises a wedged plate for displacing the line of sight of said first field of view such that said first field of view image is laterally displaced from the second field of view image on said detector; and
    means for directing said reflected light onto said second detector area.

11. An optical system for producing two different field of view images simultaneously comprising:
    first optical subsystem for producing a first field of view image;
    a second optical subsystem for producing a second field of view image, wherein the angular displacement of said second field of view is different from that of said first field of view;
    an optical detector having first and second areas;
    dichroic beamsplitter means disposed so as to transmit light from said first optical subsystem, and also disposed so as to simultaneously reflect light from said second optical subsystem, wherein said transmitted light is primarily composed of light of a first wavelength band and said reflected light is primarily composed of light of a second wavelength bank, wherein said first wavelength band comprises shorter wavelengths than said second wavelength band;
    wherein said first wavelength band is 7.25 to 8.50 microns and said second wavelength band is 8.5 to 9.5 microns;
    means for directing said transmitted light onto said first detector area; and
    means for directing said reflected light onto said second detector area.

12. An optical system for producing two different field of view images simultaneously comprising:
    first optical subsystem for producing a first field of view image;
    a second optical subsystem for producing a second field of view image, wherein the angular displacement of said second field of view is different from that of said first field of view;
    an optical detector having first and second areas;
    dichroic beamsplitter means disposed so as to transmit light from said first optical subsystem, and also disposed so as to simultaneously reflect light from said second optical subsystem, wherein said transmitted light is primarily composed of light of a first wavelength band and said reflected light is primarily composed of light of a second wavelength band, wherein said first wavelength band comprises shorter wavelengths than said second wavelength band;
    wherein said first wavelength band is 3.5 to 4.2 microns said second wavelength band is 4.5 to 5.0 microns;
    means for directing said transmitted light onto said first detector area; and
    means for directing said reflected light onto said second detector area.

13. An optical system for producing two different field of view images simultaneously comprising:
    first optical subsystem for producing a first field of view image;
    a second optical subsystem for producing a second field of view image, wherein the angular displacement of said second field of view is different from that of said first field of view;
    an optical detector having first and second areas;
    dichroic beamsplitter means disposed so as to transmit light from said first optical subsystem, and also disposed so as to simultaneously reflect light from said second optical subsystem, wherein said transmitted light is primarily composed of light of a first wavelength band and said reflected light is primarily composed of light of a second wavelength band, wherein said first wavelength band comprises shorter wavelengths than said second wavelength band;
    wherein said first wavelength band is 0.35 to 0.5 microns said second wavelength bend is 0.55 to 0.7 microns;

means for directing said transmitted light onto said first detector area; and means for directing said reflected light onto said second detector area.

14. An optical system for a missile for producing two different field of view images simultaneously comprising:

first optical subsystem for producing a wide field of view image:

a second optical subsystem for producing a narrow field of view image, including a primary mirror and a secondary mirror;

an optical detector having first and second areas;

dichroic beamsplitter means disposed on said secondary mirror so as to transmit light from said first optical subsystem, and also disposed so as to simultaneously reflect light from said second optical subsystem, wherein said transmitted light is primarily composed of light of a first wavelength band and said reflected light is primarily composed of light of a second wavelength band;

means for directing said reflected light onto said second detector area;

means for detecting said transmitted light onto said first detector area, including a wedged plate for displacing said wide field view image from said narrow field of view image; and a dual filter disposed in front of said detector having a first filter area adjacent to said first detector area for filtering out substantially all light except for said first wavelength band, and also having a second filter area adjacent to said to second detector area for filtering out substantially all light except for said second wavelength band.

* * * * *

UNITED STATES PATENT AND TRADEMARK OFFICE
CERTIFICATE OF CORRECTION

PATENT NO. : 5,161,051

DATED : November 3, 1992

INVENTOR(S) : C.G. WHITNEY and B.A. CAMERON

It is certified that error appears in the above-identified patent and that said Letters Patent is hereby corrected as shown below:

Column 2, line 60, replace "$\Delta_1$" with -- $\Delta\lambda_1$ --.

Column 3, line 11, remove the comma.

Signed and Sealed this

Sixteenth Day of November, 1993

Attest:

BRUCE LEHMAN

*Attesting Officer*  Commissioner of Patents and Trademarks